United States Patent [19]

Hirota

[11] 4,337,537
[45] Jun. 29, 1982

[54] TONEARM POSITION SETTING DEVICE

[75] Inventor: Yoshihisa Hirota, Tokorozawa, Japan

[73] Assignee: Pioneer Electronic Corporation, Tokyo, Japan

[21] Appl. No.: 137,696

[22] Filed: Apr. 7, 1980

[30] Foreign Application Priority Data

Apr. 6, 1979 [JP] Japan ............................ 54-45404[U]

[51] Int. Cl.³ .................................................. G11B 17/06
[52] U.S. Cl. .................................... 369/216; 369/184
[58] Field of Search .............. 369/216, 217, 220, 230, 369/33, 203, 184

[56] References Cited

U.S. PATENT DOCUMENTS

| | | | |
|---|---|---|---|
| 3,822,889 | 7/1974 | Nakagawa | 369/216 |
| 3,993,315 | 11/1976 | Hansen et al. | 369/216 |
| 4,098,510 | 7/1978 | Suzuki et al. | 369/217 |
| 4,184,687 | 1/1980 | Wren et al. | 369/230 |
| 4,200,295 | 4/1980 | Ikedo | 364/230 |

FOREIGN PATENT DOCUMENTS 2020880  11/1979  United Kingdom ............... 369/216

*Primary Examiner*—John W. Shepperd
*Attorney, Agent, or Firm*—Sughrue, Mion, Zinn, Macpeak & Seas

[57] ABSTRACT

A record turntable tonearm positioning system having an engagement mechanism to limit movement of the tonearm and a control system to determine tonearm position. A drive system responsive to a predetermined signal drives the engaging mechanism and a detector measures tonearm position. The control system generates the predetermined signal in response to detector output to control the drive system.

3 Claims, 11 Drawing Figures

TONEARM POSITION SETTING DEVICE

BACKGROUND OF THE INVENTION

The present invention relates to a lowering position setting device for a tonearm. More particularly, the invention relates to a lowering position setting device for a tonearm for use in an automatic record turntable capable of automatically repeating the reproduction of music recorded on a record disc.

A very large variety of audio record turntables are known in the art. In one such turntable, when a start switch is activated to start the reproduction of music recorded on a record disc, the turntable tonearm automatically begins to move toward the center of record disc, that is, in the forward direction. Hence, the tonearm automatically moves toward the beginning of the record groove of the record disc. Then, the tonearm is lowered at a position depending on the size of the record disc to start the reproduction thereof. Subsequently, after the record is finished, the tonearm is first elevated then is returned toward the arm rest. When the tonearm arrives at a position above the arm rest, it is lowered onto the arm rest.

According to the above described operational steps, the reproduction operation is carried out. An automatic record turntable is also known which is capable not only of performing the above-described reproduction operations but also an automatic repeat operation in which the same record is automatically repeated.

With a conventional automatic record turntable capable of automatic repeat reproduction of recorded music, generally, at the end of each record, the tonearm has to be returned to the arm rest and then the initial operations of the tonearm are repeated in order to again lower the tonearm to the start position on the record disc. However, this mode of operation is disadvantageous in that the automatic repeat reproduction requires a relatively long period of time from the end of the first play of the record to the beginning of the repeat play. In order to eliminate the above-described drawbacks, an automatic turntable has been proposed which is equipped with a lowering position setting mechanism for the tonearm which is capable of lowering the tonearm to a desired position, the start position on the record disc, without returning the tonearm to the arm rest during the automatic repeat operation.

The above-mentioned tonearm lowering position setting mechanism includes an interlocking device which swings or slidably moves in association with the movement of the tonearm, an engaging device which engages with the interlocking device to thereby stop the swinging or sliding operation of the tonearm at a desired tonearm position, and a driving device which drives the interlocking device and engaging device so that they engage with each other in response to a predetermined signal. The engaging device is provided with protrusions each corresponding to the size of the commercially employed sizes of record discs such as 30 cm, 25 cm and 17 cm. The engaging device is driven by the driving device so that a designated protrusion engages with the interlocking device with predetermined timing during the lead-in operation of the tonearm. Under this condition, the interlocking means engaged swinging or slidably moving with the designated protrusion of the engaging means, the tonearm is stopped at the desired lowering position. In the above described tonearm lowering position setting mechanism, the driving operation of the engaging device by the driving device must be carried out taking the size of record disc into account during the lead-in or return operation of tonearm. Therefore, the timing for the driving operation is quite critical. If a lag in the timing occurs, the stopping position of the tonearm may deviate from the desired position.

SUMMARY OF THE INVENTION

Accordingly, a primary object of the present invention is to provide an improved automatic turntable capable of eliminating the above-described drawbacks accompanying the conventional automatic record player.

Another object of this invention is to provide an improved tonearm lowering position setting device for use in an automatic player which is capable of stopping a tonearm above a desired start position on a record disc which takes the size of the record into account during both lead-in and return operations of the tone-arm with a high accuracy in order to lower the tonearm onto the desired start position to commence quickly and accurately the reproduction of music.

BRIEF DESCRIPTION OF THE DRAWINGS

In the accompanying drawings:

FIGS. 4(a) and 4(b) are explanatory diagrams in which FIG. 4(a) shows the operation of the tonearm lowering position setting device shown in FIG. 1 in a lead-in operation and FIG. 4(b) shows the operation thereof in a return operation;

FIGS. 7(a) and 7(b) are operation explanatory diagrams in which FIG. 7(a) shows the operation of another embodiment of the tonearm lowering position setting device shown in FIG. 1 in lead-in operation and FIG. 7(b) shows the operation thereof in a return operation.

DESCRIPTION OF THE PREFERRED EMBODIMENTS

The preferred embodiments of the invention will be described hereinafter in detail with reference to the accompanying drawings.

Figure 1:
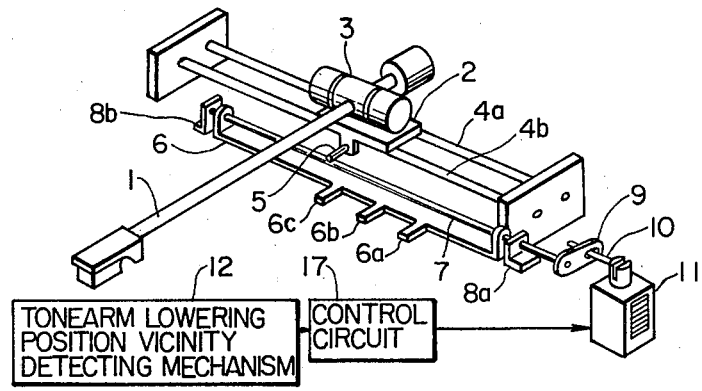
FIG. 1 is a schematic representative view illustrating a preferred embodiment of a tonearm lowering position setting device for use in a linear tracking type automatic turntable according to the present invention.

FIG. 1 is a schematic perspective view illustrating a first preferred embodiment of a tonearm lowering position setting device of the invention for use in an automatic turntable employing a linear tracking type tonearm. In FIG. 1, a tonearm 1 is supported by an arm holder 3 so as to be allowed to move in both horizontal and vertical directions. The arm holder 3 is mounted on a sliding member 2. The movement of tonearm 1 in the vertical direction is carried out by an elevation device (not shown). The sliding member 2 is slidably engaged with a pair of guide rails 4a and 4b so as to slide linearly on the guide rails 4a and 4b driven by a driving device such as an electric linear motor or the like. Furthermore, the sliding member 2 is provided with a stopper pin 5 which acts as an interlocking device which engages with an engaging device described hereinafter. This stopper pin 5 constitutes a stopping mechanism for stopping the horizontal movement of tonearm 1 together with the engaging device.

The engaging device operates to engage the stopper pin 5 so as to stop the horizontal movement of tonearm 1. The engaging device plate 6 is fixedly secured to a shaft 7 which is supported by a pair of bearing members 8a and 8b so as to be allowed to slidingly move in a longitudinal direction and further to rotate around the axis of shaft 7. The sliding range of the index plate 6 is determined by the position of the paired bearing members 8a and 8b. The index plate 6 is provided with three protrusions 6a, 6b and 6c which represent three different lowering positions of the tonearm 1, more specifically, groove start positions of 30 cm, 25 cm and 17 cm diameter records respectively. The index plate 6 is rotatingly driven by a driving device composed of a plate 9 coupled to the shaft 7 and a shaft 10 which interconnects the plate 9 and a plunger 11. The plunger 11 is driven by a control circuit 17 which receives its input from a tonearm lowering position vicinity detecting mechanism 12 which detects when the tonearm is within the vicinity of a desired lowering position. The control circuit 17 will be described in further detail below.

Figure 2:
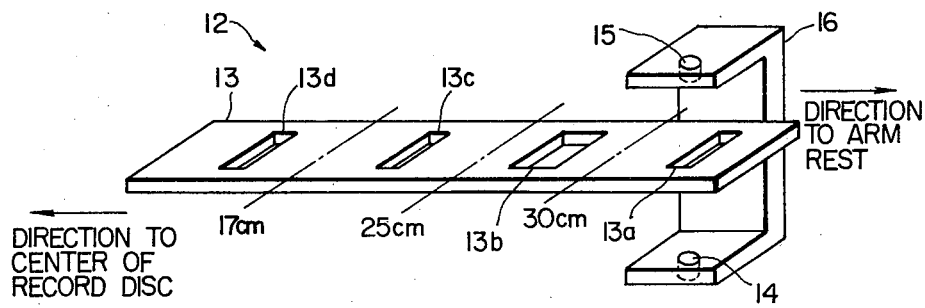
FIG. 2 is a schematic perspective view illustrating a first example of the tonearm lowering position vicinity detecting mechanism used in the embodiment of FIG. 1.
Figure 3:
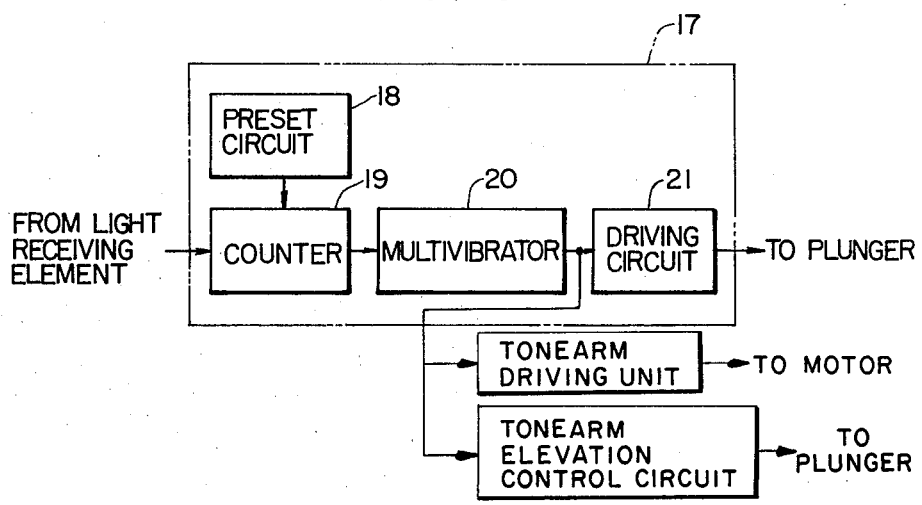
FIG. 3 is a block diagram shown an example of a control circuit used in the embodiment of FIG. 1.

FIG. 2 is a schematic perspective view illustrating a first example of the tonearm lowering position vicinity detecting mechanism 12 shown in FIG. 1. The tonearm lowering position vicinity detecting mechanism 12 includes a mask 13 having through openings each corresponding to a desired lowering position of the tonearm 1. The openings function as light control members. A light emitting element 14 and a light receiving element 15 are disposed facing each other and at opposite sides of the mask 13 on a holder 16 which slidingly moves along the mask 13 together with the tonearm 1. The holder 16 may, for example, be secured to the sliding member 2 so as to slidingly move together with the tonearm 1. The output signal of the light receiving element 15 is applied to a control circuit 17 which is shown in FIG. 3 in detail. Four through openings 13a through 13d are formed in the mask 13. The first opening 13a is provided for detecting when the tonearm 1 is in the vicinity of one of the predetermined lowering positions during lead-in operation which represents the start position on the groove of 30 cm records, the second opening 13b is provided for detecting when the tonearm 1 is in the vicinity of one of the lowering positions in the lead-in or return operation for a 25 cm or 30 cm record, the third opening 13c is provided for detecting when the tonearm 1 is in the vicinity of one of the positions for a lead in or return operation for a 17 cm or 25 cm record and the fourth one 13d is provided for performing the same return function for 17 cm records. The control circuit 17, which operates the drive of the plunger 11 in response to the output of the tonearm lowering position vicinity detecting mechanism 12, as shown in FIG. 3, includes a presetting circuit 18 for presetting the size of records which are to be played, a counter circuit 19 for counting the number of the output pulses supplied from the light receiving element 15 and which in response thereto generates an output with reference to the output of the preset circuit 18, a monostable multivibrator 20 which operates in accordance with the output of the counter circuit 19, and a driving circuit 21 for driving the plunger 11 in response to the output of the monostable multivibrator 20. The output of the monostable multivibrator 20 is also utilized as a signal for stopping the driving operation of the sliding member 2.

With the tonearm lowering position setting device constructed as described above, under the assumption that an automatic repeat reproduction of music recorded on a record disc of 30 cm is to be carried out, the operation of the device will be described hereinafter.

Figures 4A, 4B:
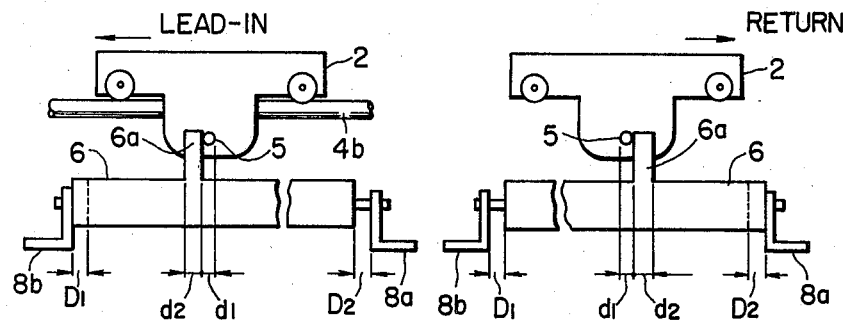

At first, both a repeat switch and a start switch, neither of which is shown, are turned on whereby the sliding member 2 is driven by an electric linear motor, for example, to linearly move along the pair of guide rails 4a and 4b in the forward direction from the right to the left in the drawing. Accordingly, the tonearm 1 begins the lead-in operation. Simultaneously, the holder 16 which is attached to the sliding member 2 begins to move in the longitudinal direction of the mask 13. When the light receiving element 15 receives light from the light emitting element 14 passing through the opening 13a, the light receiving element 15 produces the first output pulse which is applied to the control circuit 17 in the next stage. The counter circuit 19 in the control circuit 17 counts the number of pulses outputted by the light receiving element 15 and in response thereto produces a lowering position vicinity detection signal representing the start position of a 30 cm record in the lead-in operation based on the output of the presetting circuit 18 which represents the preset information with respect to 30 cm records. The detection output of the counter 19 is applied through the monostable multivibrator 20 and the driving circuit 21 to the plunger 11 as a result of which the plunger 11 drives the index plate 6 so as to rotate in the clockwise direction. Consequently, the stopper pin 5 comes into abutment with the protrusion 6a of the index plate 6 and further pushes the index plate 6 to slide in the forward direction until the left end portion of the index plate 6 abuts the bearing member 8b as shown in FIG. 4(a). In this case, assuming that the diameter of the stopper pin 5 is $d_1$ and that the width of the protrusion 6a is $d_2$, the mechanism is designed so that the sliding distance from a neutral position of the index plate 6 between the bearing members 8a and 8b to a position thereof where the left end of the index plate 6 abuts the bearing member 8b is determined by $D_1 = \frac{1}{2}(d_1 + d_2)$. When the left end of the index plate 6 abuts the bearing member 8b and the driving linear motor of the sliding member 2 has been deenergized in response to the output of the monostable multivibrator 20 in the control circuit, the tonearm 1 is stopped at a position above the desired start position on the record being played. Thereafter, the tonearm 1 is lowered onto the record start position by the elevation mechanism (not shown) and play of the record is commenced. The plunger 11 is automatically deenergized by operation of the control circuit 17 after the sliding movement of the sliding member 2 has been stopped.

After the completion of reproduction, the tonearm 1 is actuated by the elevation mechanism and the linear motor and is thereby automatically elevated and returned toward the arm rest. The holder 16 also slidingly moves interlocked with the tonearm 1. Therefore, when light emitted by the light emitting element 14 passes through the opening 13b and strikes the light receiving element 15, the light receiving element 15 generates the third pulse signal, namely, that for the return or replay operation. In response to the third pulse signal, the control circuit 17 detects the fact that the tonearm 1 is now positioned in the vicinity of the tonearm lowering position where the tonearm 1 is to be lowered to repeat the play of a 30 cm record. The control circuit 17 then supplies the driving signal to move the plunger 11. In response to the driving signal, the plunger 11 rotates the index plate 6 in the clockwise direction. As a result, the stopper pin 5 comes into abutment with the protrusion 6a of the index plate 6 and further pushes the index plates 6 in the backward direction as shown in FIG. 4(b) until the right end portion of the index plate 6 abuts the bearing member 8a. In this case, similar to the case illustrated in FIG. 4(a), the mechanism is designed so that the sliding distance $D_2$ from a neutral position of the index plate 6 between the bearings 8a and 8b to a position thereof where the right end of the index plate 6 abuts the bearing member 8a is determined by $D_2 = \frac{1}{2}(D_1 + D_2)$. Therefore, the tonearm 1 is stopped at the same position as for the lead-in operation, that is, above the start position for a 30 cm record. The tonearm 1 is then automatically lowered onto the record by the elevation mechanism to start a repeat play operation. This automatic repeat operations continue until the repeat switch is turned off.

While the above description has been given for an automatic turntable employing a linear tracking type tonearm assembly, it is apparent that the invention is applicable to an automatic turntable employing an offset tonearm or a normal swing-type tonearm. This may be accomplished by modifying the configuration of the mask and changing the positions of the light emitting and receiving elements.

Figure 5:
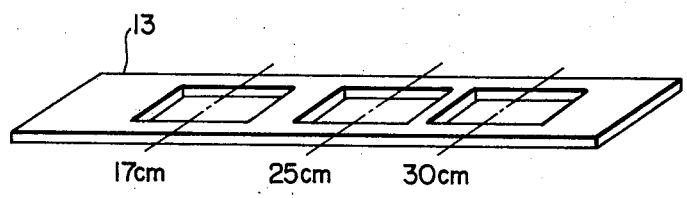
FIG. 5 is a schematic perspective view illustrating an alternate embodiment of a masking shelter 13 shown in FIG. 2.

Furthermore, with respect to the tonearm lowering position vicinity detecting mechanism 12, the mechanism may be constructed with a mask 13' as shown in FIG. 5 in which three openings are provided having a predetermined width in both forward and reverse directions with respect to the tonearm lowering position. In this case, although it is possible that the above-described control circuit 17 can be replaced by a circuit having a simple construction which only amplifies the output of the light receiving element 15, since the distance between the tonearm lowering positions for 30 cm and 25 cm records is only 25 mm so that the width of the opening in the longitudinal direction is limited, the driving mechanism for the index plate 6 and the circuit construction of the control circuit 17 must operate at a high speed.

Figure 6:
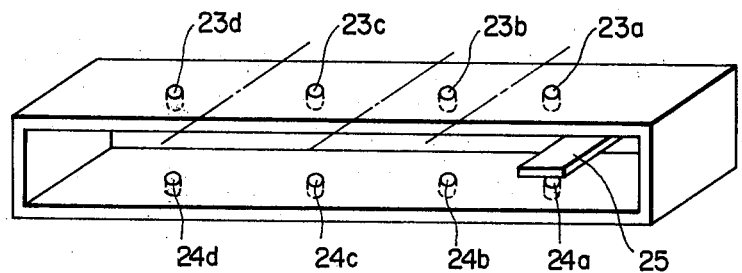
FIG. 6 is a schematic perspective view illustrating a second example of a tonearm loering position vicinity detecting mechanism shown in FIG. 2.

FIG. 6 is a schematic perspective view illustrating another example of a tonearm lowering position vicinity detecting mechanism. In FIG. 6, light emitting elements 23a through 23d are provided at the positions corresponding to those of the openings 13a through 13d, respectively, and light receiving elements 24a through 24d are arranged so as to face the corresponding light emitting elements 23a through 23d. A light blocking member 25 is provided on the sliding member 2 so as to pass through a gap existing between the light emitting and receiving elements so as to interrupt the light path when it is positioned between a pair of light emitting and receiving elements. To this end, since no lead wire need be connected to the light blocking member 25 which slidingly moves together with the tonearm 1, smooth movement of the tonearm 1 is provided.

Figure 8:
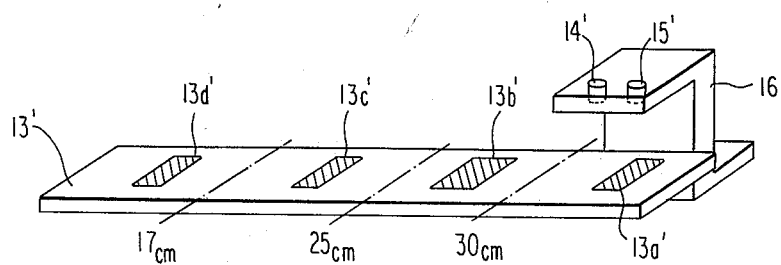
FIG. 8 is a schematic perspective view of a second example of a tonearm lowering position vicinity detecting mechanism usable in FIG. 1.
Figure 9:
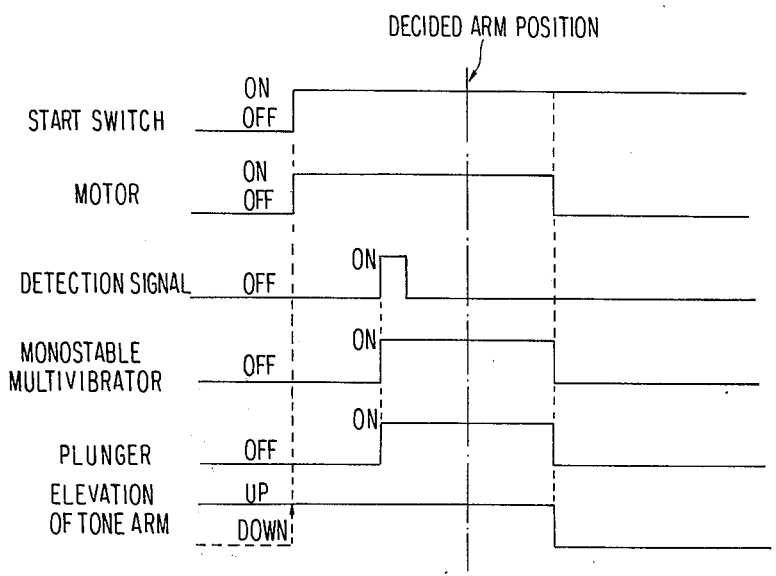
FIG. 9 is a diagram showing the timing and positioning sequences.

Furthermore, while the above examples of the tonearm lowering position vicinity detecting mechanism employ a pair of light emitting and receiving elements facing each other and a light blocking member having an opening or a mask member as shown in FIG. 2, there is no need to provide light emitting and receiving elements at opposite sides. More specifically, as shown in FIG. 8 light emitting and receiving elements 14' and 15' are provided on holder T6 at one side of support 13' and mirrors 13a'–13d' are provided on support 13' which moves interlocked with the tonearm 1. The mirrors 13a'–13d' functionally correspond to the apertures 13a–13d in FIG. 2. The light receiving element 15' is arranged so that it can receive the light emitted by the light emitting element 14' and reflected by the mirrors 13a'–13d'.

Moreover, it is not absolutely necessary to utilize an optical sensing element. That is, the detecting mechanism may be constituted by a conductive pin mounted on the sliding member 2 and a detection plate slidably contacting the pin and provided with plural conductive portions each representing a different tonearm lowering position. Other modifications of the detecting mechanism 12 are possible for one of ordinary skill in the art without departing from the essential scope of the invention.

Figure 7A:
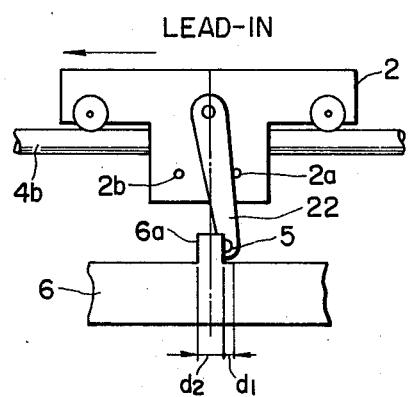
Figure 7B:
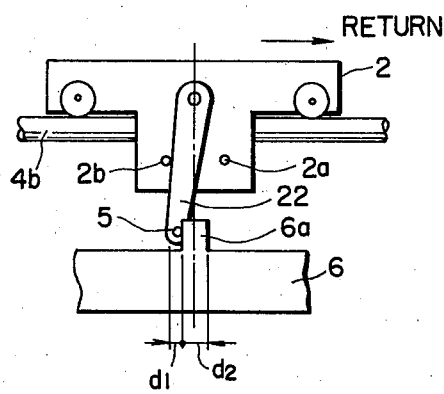

FIGS. 7(a) and 7(b) are explanatory diagrams showing a modification of the tonearm lowering position setting device shown in FIGS. 4(a) and 4(b). In this example, the stopping mechanism includes a pivot member 22 pivotably connected to the sliding member 22 with the pivot member 22 being provided with a stopper pin 5 at its end portion, a pair of engaging pins 2a and 2b mounted on the sliding member 2 for defining the pivot range of the pivot member 22, a rotatable index plate 6 having a plurality of protrusions capable of engaging the stopper pin 5 of the pivot member 22 to stop the movement of tonearm 1. (Only one protrusion is illustrated in FIGS. 7(a) and 7(b) for purposes of clarity.) The index plate 6 is, as described hereinbefore, rotated by the plunger 11.

With the tonearm lowering position setting device having the above described stopping mechanism, in the lead-in operation, the plunger 11 rotates the index plate 6 in response to a predetermined signal supplied from the control circuit 17. Consequently, the stopper pin 5 first comes into abutment with the protrusion 6a of the index plate 6 after which the sliding member 2 slidingly moves along the guide rails 4a and 4b until the pivot member 22 provided with the stopper pin 5 abuts the engaging pin 2a as shown in FIG. 7(a). In this case, assuming that the diameter of the stopper pin 5 is $d_1$ and the width of the protrusion 6a is $d_2$, the stopping mechanism is designed so that pivot range defined by the abutment position of the pivot member 22 and the engaging pin 2a is determined by $\frac{1}{2}(d_1 + d_2)$. Upon the abutment of the pivot member 22 and the engaging pin 2a, the sliding member 2 is stopped to thereby stop the tonearm 1 above the start position of the record to be played. Thereafter, the tonearm 1 is lowered onto the record to start the play of the record by the elevation mechanism. The plunger 11 is turned off by the control circuit 17 after the driving operation of the sliding member 2 is stopped.

In the return operation, the plunger 11 operates to rotate the index plate 6 in response to a predetermined signal from the control circuit 17. As a result, the stopper pin 5 first comes into abutment with the protrusion 6a of the index plate 6 after which the sliding member 2 slidingly moves until the pivot member 22 abuts the engaging pin 2b as shown in FIG. 7(b). In this case, the stopping mechanism is designed so that the range defined by the abutment of the pivot member 22 and the engaging pin 2b is determined by $\frac{1}{2}(d_1+d_2)$. Therefore, the tonearm 1 is stopped at the same position as the stop position thereof in the lead-in operation, that is, at the proper start position on the record then being played.

As described in detail hereinafter, according to the present invention, in both lead-in operations and return operations of the tonearm, it is possible to stop the tonearm at a desired lowering position with a high accuracy.

What is claimed is:

1. A tonearm lowering position setting device for a record turntable comprising:
   a moving means carrying a tonearm for horizontal movement;
   engaging means for engaging said moving means at a desired lowering position of said tonearm to thereby stop the horizontal movement of said tonearm;
   driving means for driving said engaging means so as to be in an engaging condition with said moving means in response to a predetermined signal;
   detecting means for detecting when said tonearm is positioned in the vicinity of the desired lowering position; and
   a control means for supplying said predetermined signal to said driving means in response to the output of said detecting means.

2. The tonearm lowering position setting device as defined in claim 1 wherein said detecting means comprises a fixed optical control member provided with a plurality of openings representative of the vicinity of the desired lowering position of said tonearm and light emitting means and light receiving means mounted on means for movement with said tonearm and arranged on opposite sides with respect to said first optical control member, said light emitting means and said light receiving means facing each other.

3. The tonearm lowering position setting device as defined in claim 1 wherein said detecting means comprises a fixed control member having reflecting portions each representing the vicinity of a desired lowering position and light emitting means and light receiving means mounted on means for movement with said tonearm so that light emitted from said light emitting means is reflected by said reflecting portion and the reflected light is received by said light receiving means.

* * * * *